Patented Sept. 15, 1931

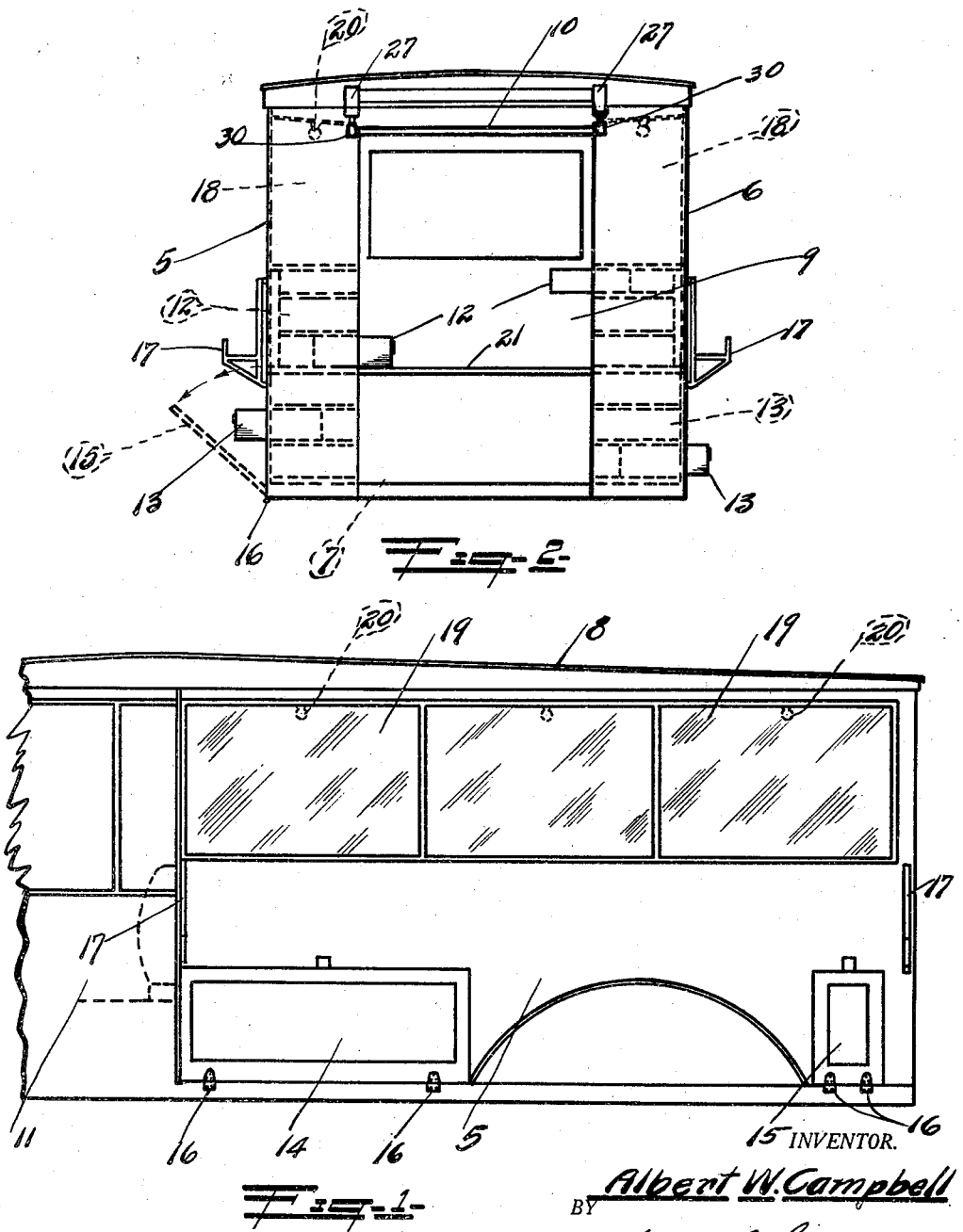

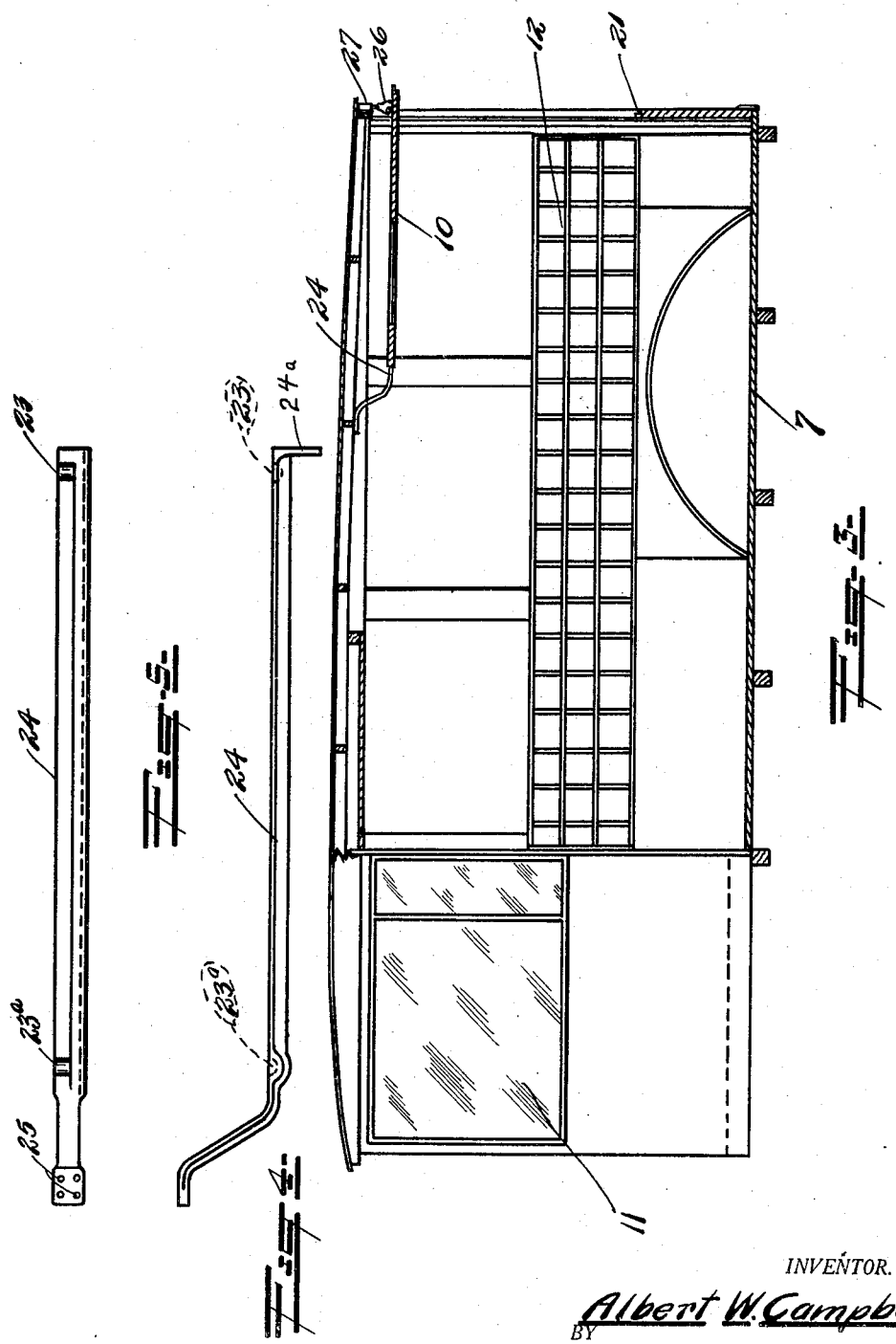

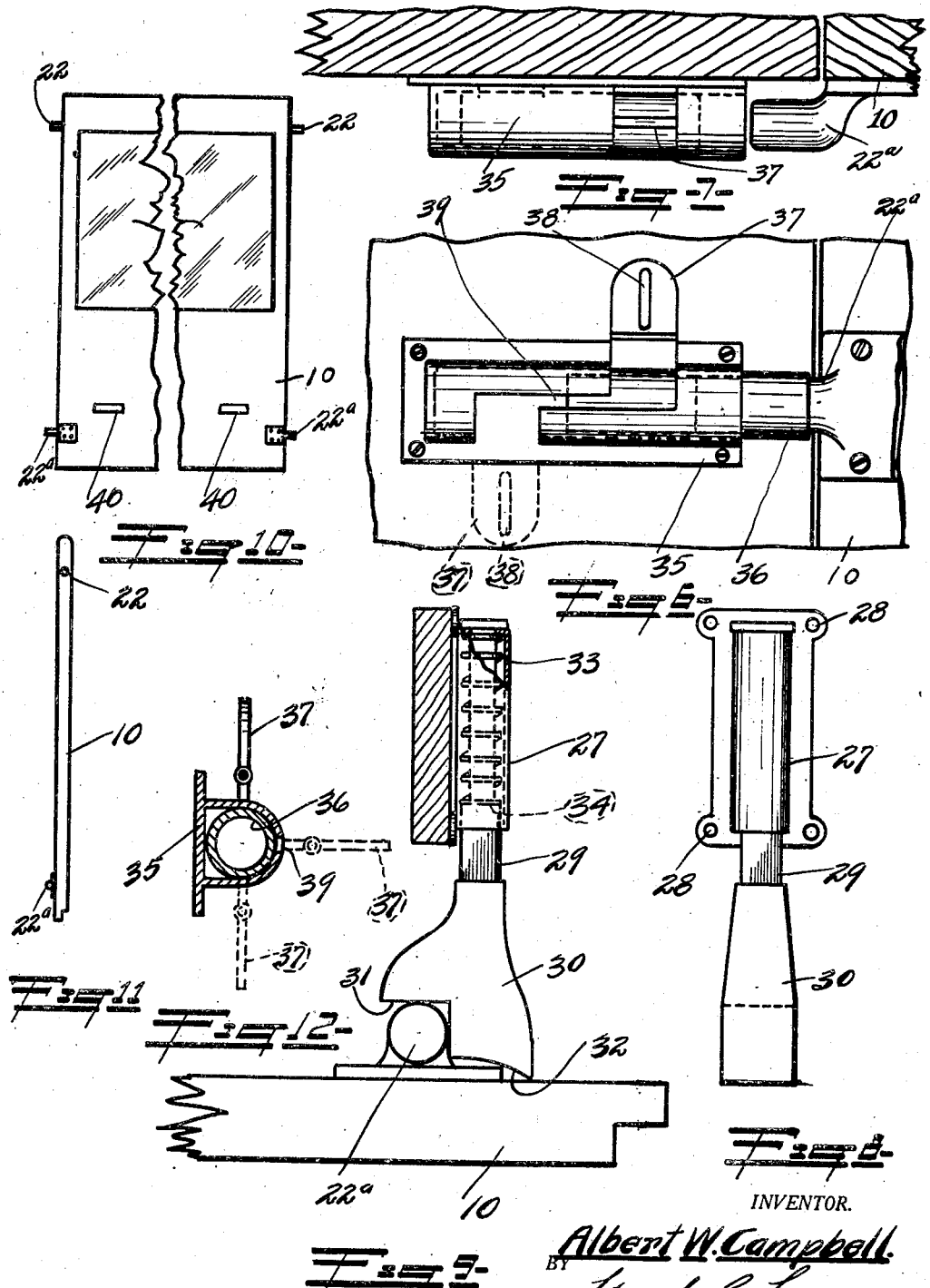

1,823,643

UNITED STATES PATENT OFFICE

ALBERT W. CAMPBELL, OF BAY CITY, MICHIGAN

BODY CONSTRUCTION

Application filed October 17, 1927. Serial No. 226,599.

This invention relates to automobile bodies, and particularly to a vehicle body designed to accommodate varied assortment of parts, pieces, tools, or other articles.

The prime object of the invention is to design a vehicle body having a plurality of drawers, in which various sizes and kinds of fittings, screws, bolts, and accessories can be placed, so that the body will in reality be a complete shop, mounted on wheels, making it unnecessary to travel back and forth between a definite located shop or storehouse and the place where work is being carried on to secure fittings, tools or other parts needed.

Another object is to provide a novel door and locking mechanism, which will permit of free and unobstructed space in the rear of the body, so that work of any nature can be carried on without hindrance or annoyance caused by swinging hinged doors swinging back and forth by the wind.

A still further object is to provide a very simple, substantial and complete vehicle body for various trades, in which every part, fitting, or tool will have its place, which will be inexpensive to build, and which is also a practical and effective advertising medium, the upper portion of said body being designed to support and display the various goods of the owner.

The above and other objects will appear as the specification progresses, reference being had to the accompanying drawings in which I have shown the preferred embodiment of my invention, and in which like reference numerals indicate like parts throughout the several views thereof.

In the drawings,

Fig. 1 is a fragmentary side view of my improved vehicle body.

Fig. 2 is a rear view thereof, the rear door being open.

Fig. 3 is a longitudinal sectional view.

Fig. 4 is an edge view of one of the door supporting tracks.

Fig. 5 is a top plan view thereof.

Fig. 6 is a side view of the door latching mechanism showing the latch in locked position.

Fig. 7 is a plan view thereof, the bolt being shown in unlocked position.

Fig. 8 is a back view of the door stop.

Fig. 9 is an edge view thereof showing also the end of the door.

Fig. 10 is a view of the back door.

Fig. 11 is an edge view thereof.

Fig. 12 is a cross-sectional view of the latch mechanism shown in Figs. 6 and 7.

Referring now particularly to the drawings, the numerals 5 and 6 indicate the side walls of the body which can be of conventional design having a floor 7 and a top 8, an opening 9 being provided in the rear said body, and a door 10 forms a closure for said opening, the front being in the form of a conventional cab 11 for the accommodation of the driver.

A plurality of drawers 12 are provided on opposite sides of the body as shown in Figs. 2 and 3 of the drawings, a clear isle space being provided therebetween, these drawers are placed in superimposed relation the upper drawers shown in Fig. 2 and 3, sliding inwardly into the isle, while the lower drawers 13 slide outwardly as indicated by the arrows, these lower drawers being covered and concealed from view, by means of doors 14 and 15 respectively, hinged to the body at 16, and which serve to prevent the drawers sliding out when the vehicle is in motion.

Brackets 17 are secured to the corners of the body and sections of pipe, rods, or other pieces can be carried thereby. The space 18 above the drawers can be suitably divided, and windows 19 are set in the side wall, so that any articles can be displaced, these articles being suitably secured and fastened in this space, which is lightened by means of fixtures 20, energized from the battery of the vehicle.

The rear door 10 slides upwardly and into the body, and lower edge being shouldered to interlock as shown at 21, spaced apart laterally projecting top and bottom dowels 22 and 22a are provided on the edges of the door, the upper pair of dowels being mounted in pockets 23 provided in the spaced apart track members 24, which are in turn secured in the upper part of the body and which are formed as clearly shown in Figs. 4 and 5, the lower dowels being in the form of a casting with the dowels projecting above the face thereof as shown in Fig. 7. The front end of each track is curved upwardly, and openings 25 are provided to facilitate attachment to the roof, the rear end having a downwardly projecting lip 24a and is secured to the door frame in the usual manner.

Additional pockets 23a are provided in these tracks, and accommodate the top pair of dowels when the door is in raised position, said door being hung by means of the top dowels which rest in the rear pockets when in closed position. When the door is in raised position, the bottom thereof will project slightly beyond the body stops 26 which are bolted to the body as shown, and serve to prevent displacement of said door, these stops comprising a housing 27 having screw receiving openings 28 therein a squared plunger 29 is mounted in said housing, and a stop 30 is secured to or formed integral with said plunger being shouldered as shown at 31 to accommodate the dowel, the lower edge being rounded as at 32. This plunger is tensioned by means of a spring 33 which is interposed between the shoulder 34 and the top of the housing.

Latches 35 are provided on the body, and engage the lower dowels on the door, each latch comprising a housing in which a sleeve 36 is slidably mounted and which slips over and accommodates the dowel, a hinged tongue 37 being secured to said sleeve, and is formed with an opening 38 adapted to receive a staple, (not shown), so that a conventional lock may be inserted, a passage 39 being provided in said housing to accommodate said tongue, and permit it to be shifted longitudinally to unlocked position, and as shown by dotted lines in Fig. 6.

In practice when it is desired to raise the door, the operator grasps the tongue 37 rotates the sleeve 36 to permit the tongue to enter the passage 39 and be shifted to unlocked position, he then grasps the handles 40, raising the door, and sliding it inwardly until the lower dowels engage the rounded surface 32 of the stops 26, compressing the plunger until the door can be moved forward to permit the dowels to enter the pockets 23 and 23a, the stops then shift to position shown in Fig. 9, and the door is locked in position, until the operator raises the stops out of engagement with the dowels to permit the door to be moved rearwardly.

It will of course be understood that both sides of the body are alike, and that the latches and stops are mounted in pairs.

From the foregoing discription it will be obvious that I have perfected a very simple, substantial, and economical vehicle body for use by plumbers, electricians, and tradesmen in general, for dispensing goods of various kinds.

What I claim is:—

In combination with a vehicle body having a door mounted therein and slidable upwardly and inwardly into said body, spaced apart tracks hung from the top of the body, and provided with spaced apart pockets therein, track engaging means on the edge of the door and adapted to nest in said pockets when the door is in raised position, and resiliently mounted means having cam shaped shouldered jaws for engaging said track engaging means when the door is in raised position.

In testimony whereof I hereunto affix my signature.

ALBERT W. CAMPBELL.